United States Patent
Kim et al.

(10) Patent No.: US 10,680,905 B1
(45) Date of Patent: Jun. 9, 2020

(54) APPLICATION HELP DESK

(71) Applicant: MOBILE IRON, INC., Mountain View, CA (US)

(72) Inventors: Mansu Kim, Cupertino, CA (US); Benjamin Markines, Sunnyvale, CA (US); Suresh Kumar Batchu, Milpitas, CA (US)

(73) Assignee: MOBILE IRON, INC., Mountain View, CA (US)

( * ) Notice: Subject to any disclaimer, the term of this patent is extended or adjusted under 35 U.S.C. 154(b) by 479 days.

(21) Appl. No.: 14/563,483

(22) Filed: Dec. 8, 2014

Related U.S. Application Data

(60) Provisional application No. 61/913,030, filed on Dec. 6, 2013.

(51) Int. Cl.
| | | |
|---|---|---|
| *H04L 29/00* | (2006.01) | |
| *H04L 12/24* | (2006.01) | |
| *H04L 29/08* | (2006.01) | |
| *G06F 3/14* | (2006.01) | |
| *G06Q 10/10* | (2012.01) | |
| *H04M 3/51* | (2006.01) | |

(52) U.S. Cl.
CPC ............ *H04L 41/22* (2013.01); *G06F 3/1454* (2013.01); *G06Q 10/10* (2013.01); *H04L 67/00* (2013.01); *H04L 67/14* (2013.01); *H04L 67/141* (2013.01); *H04M 3/5191* (2013.01)

(58) Field of Classification Search
CPC ..... G06F 9/4446; G06F 3/1454; H04L 67/00; H04L 67/14; H04M 3/5191; G06Q 10/10
See application file for complete search history.

(56) References Cited

U.S. PATENT DOCUMENTS

| | | | |
|---|---|---|---|
| 6,965,924 B1 | 11/2005 | Gerthe | |
| 8,819,249 B2 | 7/2014 | Harrison | |
| 8,849,979 B1* | 9/2014 | Qureshi | H04L 12/2856 709/220 |
| 2006/0217111 A1* | 9/2006 | Marolia | G06F 8/65 455/418 |
| 2007/0101407 A1 | 5/2007 | Cheung | |
| 2008/0064383 A1* | 3/2008 | Nath | H04L 41/046 455/418 |
| 2009/0080453 A1 | 3/2009 | Stirbu | |
| 2012/0289219 A1* | 11/2012 | Parmar | H04M 3/523 455/419 |
| 2013/0094423 A1 | 4/2013 | Wengrovitz | |
| 2013/0143522 A1* | 6/2013 | Rege | H04W 4/26 455/405 |

(Continued)

*Primary Examiner* — Amy Ng
*Assistant Examiner* — Sajeda Muhebbullah
(74) *Attorney, Agent, or Firm* — Van Pelt, Yi & James LLP

(57) ABSTRACT

Techniques to establish a communication system between an administrative node, such as a remote help desk, and an instance of a managed mobile app running on a mobile device are disclosed. In various embodiments, an indication is received to establish a help desk session associated with a mobile device. A help desk library embedded in mobile app code comprising a managed mobile app installed on the mobile device is used to provide the help desk session. The help desk library is configured to provide in real time to a help desk system external to the mobile device mobile app data associated with the managed mobile app while the managed mobile app is running on the mobile device.

17 Claims, 13 Drawing Sheets

(56) References Cited

U.S. PATENT DOCUMENTS

| | | | |
|---|---|---|---|
| 2013/0332524 A1* | 12/2013 | Fiala | H04W 4/001 |
| | | | 709/204 |
| 2014/0032691 A1 | 1/2014 | Barton | |
| 2014/0040979 A1* | 2/2014 | Barton | H04L 63/20 |
| | | | 726/1 |
| 2014/0086105 A1 | 3/2014 | Kang | |
| 2014/0154648 A1* | 6/2014 | Gonsalves | G06Q 10/10 |
| | | | 434/219 |
| 2014/0250472 A1 | 9/2014 | Huang | |
| 2014/0254788 A1* | 9/2014 | Annapareddy | H04M 3/5183 |
| | | | 379/265.09 |
| 2015/0095773 A1* | 4/2015 | Gonsalves | G06F 9/4446 |
| | | | 715/709 |
| 2015/0160634 A1 | 6/2015 | Smith | |
| 2015/0304484 A1 | 10/2015 | Halmstad | |
| 2016/0134996 A1 | 5/2016 | Verma | |
| 2016/0364200 A1 | 12/2016 | Beveridge | |

* cited by examiner

US 10,680,905 B1

APPLICATION HELP DESK

CROSS REFERENCE TO OTHER APPLICATIONS

This application claims priority to U.S. Provisional Patent Application No. 61/913,030, entitled APPLICATION HELP DESK filed Dec. 6, 2013 which is incorporated herein by reference for all purposes.

BACKGROUND OF THE INVENTION

Today many companies (e.g., enterprise organizations) have their own applications, which allow employees to use their mobile device(s) for work. These enterprise applications are becoming mission critical component(s) to the enterprise employee. But, when there are issues with the enterprise apps, an enterprise helpdesk team may be "flying blind" in diagnosing and/or troubleshooting the issues. For example, the helpdesk team typically is not able see what the user is trying to do on their device. Consequently, they may only be able to help the employee with information relayed via phone calls, email, etc.

BRIEF DESCRIPTION OF THE DRAWINGS

Various embodiments of the invention are disclosed in the following detailed description and the accompanying drawings.

DETAILED DESCRIPTION

Figure 1:
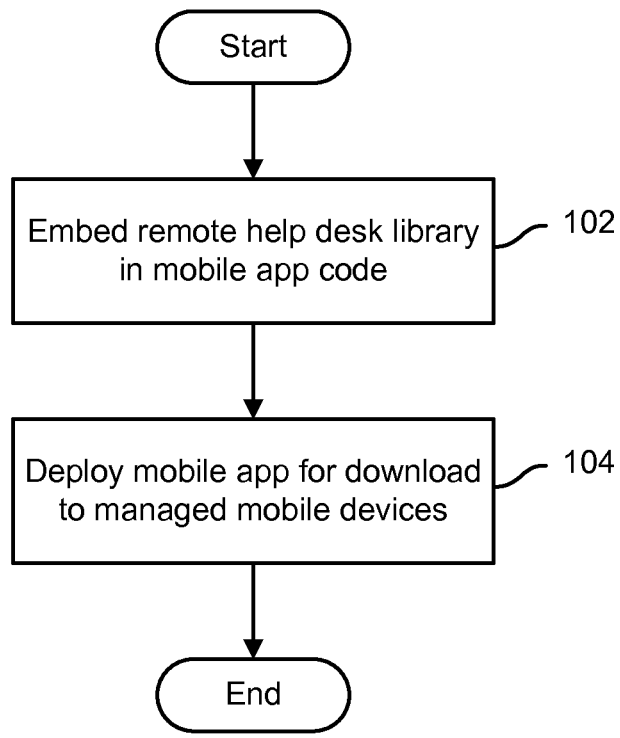
FIG. 1 is a flow chart illustrating an embodiment of a process to provide a mobile app configured to provide helpdesk functionality.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to provide to a remote administrative user, such as an enterprise or other help desk technician, a live, dynamic, and interactive view of a mobile app instance as running on a mobile device are disclosed. In various embodiments, a helpdesk library may be generated. The helpdesk library may be embedded to one or more enterprise applications to connect a running application instance to an enterprise helpdesk's viewer. Techniques disclosed herein in various embodiments may provide a remote view of device's app screen, app folder, device logs, and/or remote control function.

In some embodiments, the techniques disclosed herein may allow the automation of a helpdesk session. As a helpdesk session is live, a separate system may listen and index the session. Past help sessions may be leveraged in order to streamline future sessions. In other words, the diagnosis and resolution to one problem for one user may be leveraged to resolve a similar problem for another user. Furthermore, trends may be discovered and feature performance identified.

FIG. 1 is a flow chart illustrating an embodiment of a process to provide a mobile app configured to provide helpdesk functionality. In the example shown, a remote help desk library is embedded in the mobile app code of the mobile app (102), and the mobile app is deployed for download to managed mobile devices (104), for example via an enterprise app store.

According to some embodiments, the library may be embedded in applications using various approaches. Techniques for embedding the library may include, for example, embedding the library using a software development kit (SDK) that a developer adds to the application source code, wrapping a library into a compiled application binary, injecting the library to an application dependent system library, and/or other approaches.

In various embodiments, the library may be configured to capture an application's current screen and send a representation of the screen (e.g., a rendering of the screen) to the helpdesk viewer. The helpdesk library may also provide view(s) of the application's data folders, provide device logs and views, facilitate inject actions (e.g. touch button, typing keyboard), perform method calls, replace an application's file to recovery, and/or perform other actions. By embedding the library in the application, the library may access the functionality (e.g., all functionality) of the application.

Figure 2:
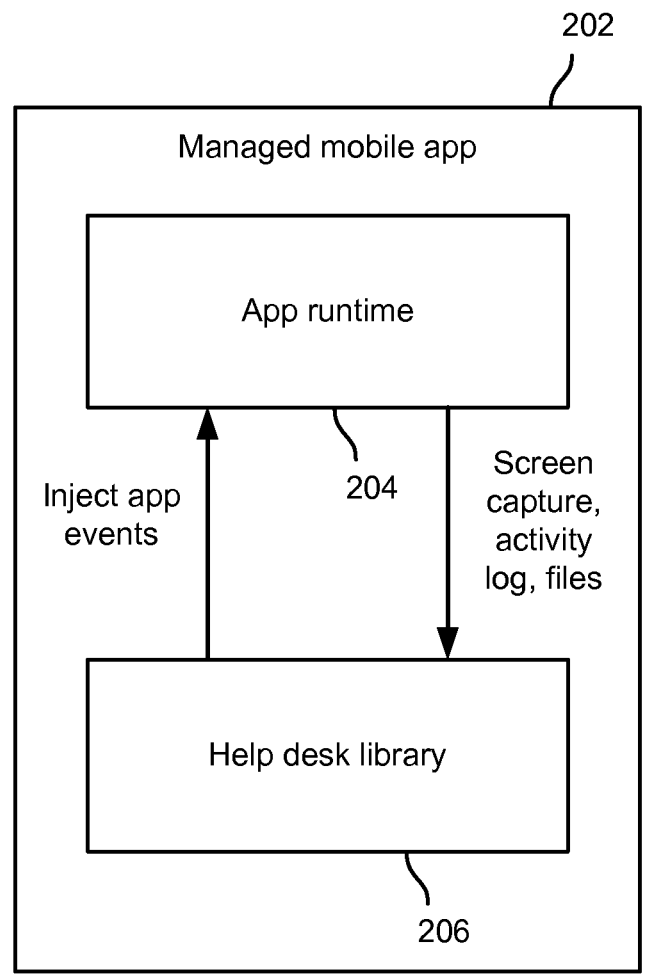
FIG. 2 is a block diagram illustrating an embodiment of a mobile app in which a help desk library is embedded.

FIG. 2 is a block diagram illustrating an embodiment of a mobile app in which a help desk library is embedded. In the example shown, managed mobile app 202 includes code that provides an application runtime 204 and associated app functionality and an embedded help desk library 206. At runtime, help desk library 206 is used to obtain, store, and transmit to a remote help desk application runtime data such as screen captures, activity logs, and app file/folder information. In various embodiments, the embedded help desk library 206 may be configured to obtain real time contextual information, such as location, signal strength, and OS/app versions. In addition, help desk library 206 may be used to inject app events. For example, a help desk administrative user at a remote location may use a help desk console or other interface to indicate an app input or other action desired to be performed at the mobile app instance with respect to which a help desk session has been established. A communication from the remote help desk system to the instance of managed mobile app 202 on a host mobile device may be sent to prompt the help desk library 206 to provide to the app runtime 204 data that simulates the corresponding input has if it had been made by a user of the mobile device, e.g., via an app interface displayed on a touch-sensitive display screen of the mobile device. In this way, user interactions with the mobile app 202 may be performed by the help desk technician from the remote site in the same manner as if the technician were to have the mobile device in his/her hands, enabling problems the mobile device user has experienced to be diagnosed through very direct interaction with the specific app instance as it is running on the mobile device user's device.

Figure 3:
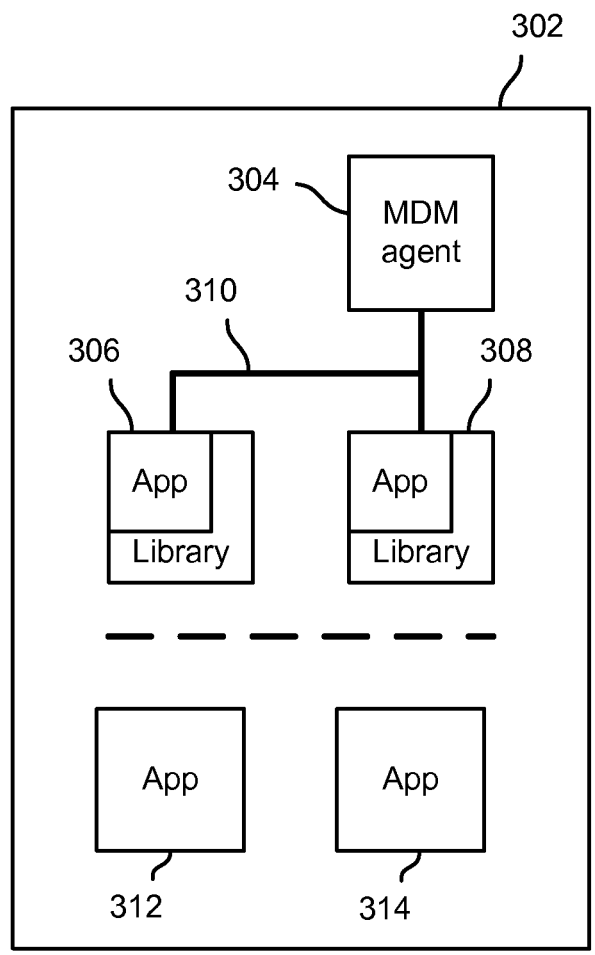
FIG. 3 is a block diagram illustrating an embodiment of a mobile device.
Figure 4:
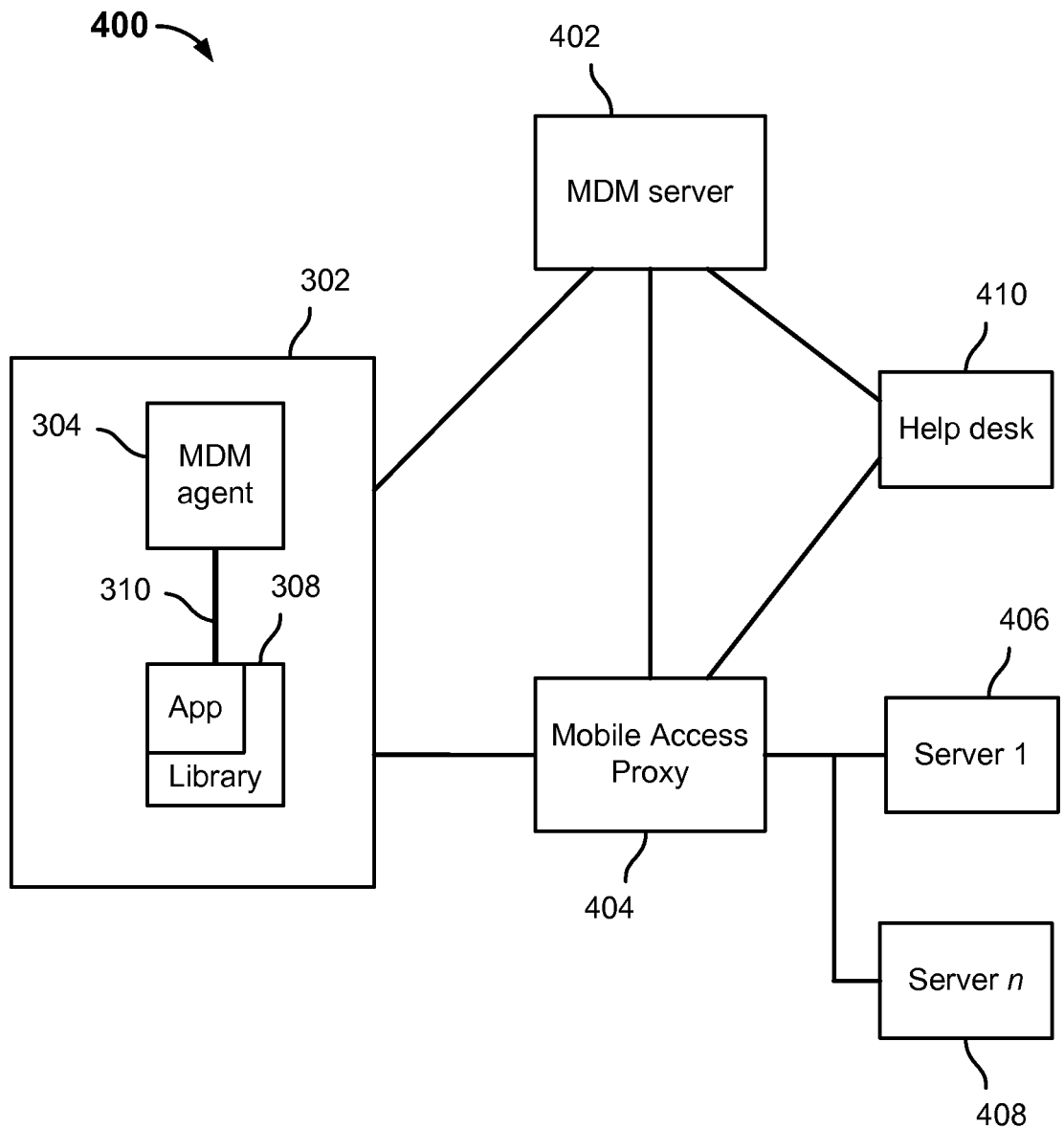
FIG. 4 is a block diagram illustrating an embodiment of a mobile device management system and architecture.

FIG. 3 is a block diagram illustrating an embodiment of a mobile device. In the example shown, mobile device 302 includes a mobile device management (MDM) agent 304, e.g., a mobile app or other client that provides MDM capabilities on the mobile device 302, as configured by and/or under the control and direction of a remote MDM server, not shown in FIG. 3. The MDM agent 304 is associated with and participates in the management of a set of managed mobile apps associated with a secure zone (above the dotted line in FIG. 3) of mobile device 302. In the example shown, the set of managed apps include managed apps 306 and 308, each of which in this example include help desk and/or other MDM libraries, embedded in the app code of the mobile app. MDM agent 304 and managed mobile apps such as apps 306 and 308 communicate securely via a secure communication bus 310. In various embodiments, the secure communications bus 310 comprises a secure app connect bus, such as described in U.S. patent application Ser. No. 14/137,745, entitled SECURE MOBILE APP CONNECTION BUS, filed Dec. 20, 2013 and published as US-2014-0181518-A1 on Jun. 26, 2014, the disclosure of which is incorporated herein by reference in its entirety for all purposes. In the example shown in FIG. 3, non-managed mobile apps 312 and 314 are installed on mobile device 302 but are not in the secure zone, not under management associated with MDM agent 304, and not connected to the MDM agent 304 or managed apps 306 and 308 by secure bus 310. In various embodiments, MDM agent 304 and/or managed apps such as apps 306 and 308 may participate in remote app help desk sessions as disclosed herein FIG. 4 is a block diagram illustrating an embodiment of a mobile device management system and architecture. In the example shown, the mobile device management system 400 includes an MDM server 402 and an associated mobile access proxy 404. In various embodiments, MDM server 402 configures MDM agents on managed mobile devices, such as MDM agent 304 of mobile device 302, in accordance with configurations, policies, etc., established by an administrative user, e.g. using an administrative MDM console, client application, web-based application, etc. MDM server 402 also may monitor security posture information for each of a plurality of managed mobile devices, and provide dynamically updated security posture information to mobile access proxy 404. In various embodiments, mobile access proxy 404 provides access to enterprise back end services, such as email, file sharing, etc., represented in FIG. 4 by servers 406 and 408. For example, a managed email app on mobile device 302 may access an enterprise Microsoft® Exchange® or other email server included in servers 406, 408 by connect to and/or through mobile access proxy 404. Mobile device and/or mobile app security posture information may be obtain by mobile access proxy 404 from MDM server 402 and may be used by mobile access proxy 404 to determine whether to and/or a manner in which to allow access by the mobile device and/or managed mobile app instance to protected resources on the enterprise network, such as servers 406 and 408.

The mobile device management system 400 of FIG. 4 further includes a help desk 410. In various embodiments, help desk 410 may comprise one or more of a help desk application, console, workstation, device, or system configured at least in part to provide mobile app help desk functionality as disclosed herein. In various embodiments, a help desk technician may use help desk 410 to initiate a help desk session with respect to a particular mobile device and/or managed app instance; join a session initiated at the mobile device, e.g., via a managed app or MDM agent; obtain and view mobile app instance screen captures, activity logs and other tracking data, and/or app folder and/or file information. In some embodiments, help desk 410 may be used to exercise control over mobile app instances running on remote mobile devices. For example, a technician using help desk 410 in various embodiments may invoke a help desk library embedded in an instance of a managed mobile app, such as managed app 308 in the example shown in FIG. 4, to request and receive screen captures, activity logs, and folder/file information, and/or to provide virtually app inputs, such as by using the embedded help desk library to provide to an app runtime of the mobile app instance a user input data associated with user input as if the corresponding input had actually been made by the mobile device user, e.g., via a touch screen or other input/control device comprising the mobile device.

In various embodiments, a helpdesk session between an application and a helpdesk can be initiated. A helpdesk session may be initiated in one of the following ways:
Helpdesk can send a push notification to a target application to launch the application and start the helpdesk session.
User can initiate a helpdesk action from an application to connect to the helpdesk.
For a shared helpdesk session, the helpdesk can send a helpdesk command to a management app which controls a suite of applications.

Figure 5:
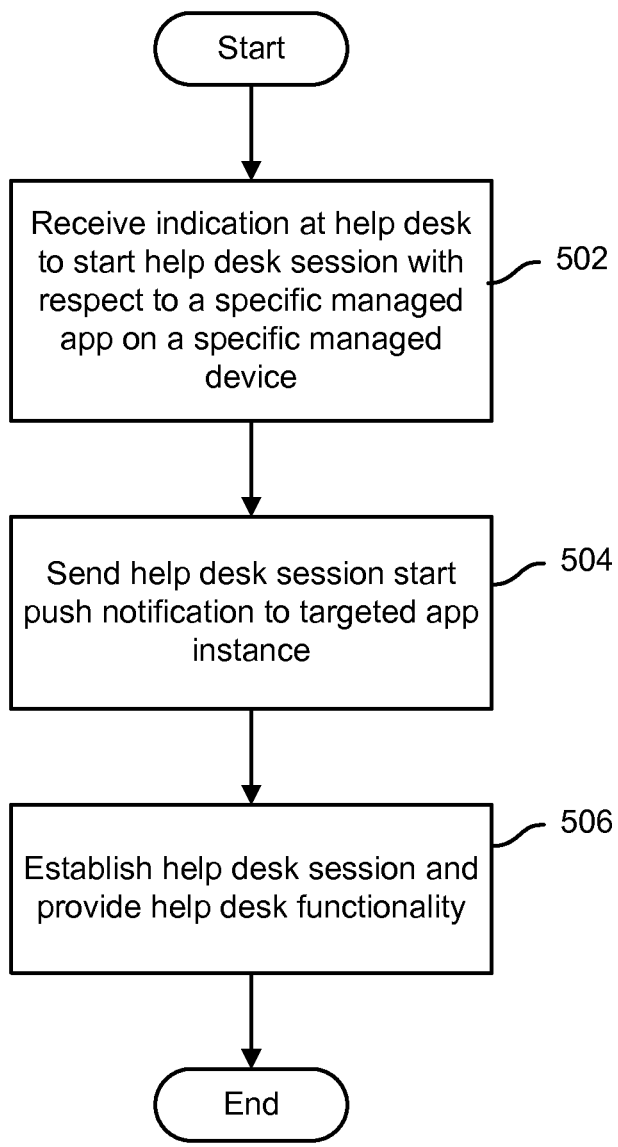
FIG. 5 is a flow chart illustrating an embodiment of a process to provide a help desk initiated help desk session.

FIG. 5 is a flow chart illustrating an embodiment of a process to provide a help desk initiated help desk session. In the example shown, an indication is received at a help desk, such as help desk 410 of FIG. 4, to initiate a help desk session (502), e.g., with respect to a specific managed mobile app instance associated with a specific managed mobile device, such as managed app 308 on mobile device 302 in the example shown in FIGS. 3 and 4. A "help desk session start" push notification is sent to the targeted managed app instance (504). For example, an Apple (iOS) or other app push notification network may be used to send the push notification. In various embodiments, a component included in a help desk library embedded in the app code of the targeted app may be responsive to the push notification and/or user action taken based thereon to cause the managed app instance to participate in establishing the help desk session. A help desk session is established and used to provide support to an app user of the mobile app (506).

Figure 6:
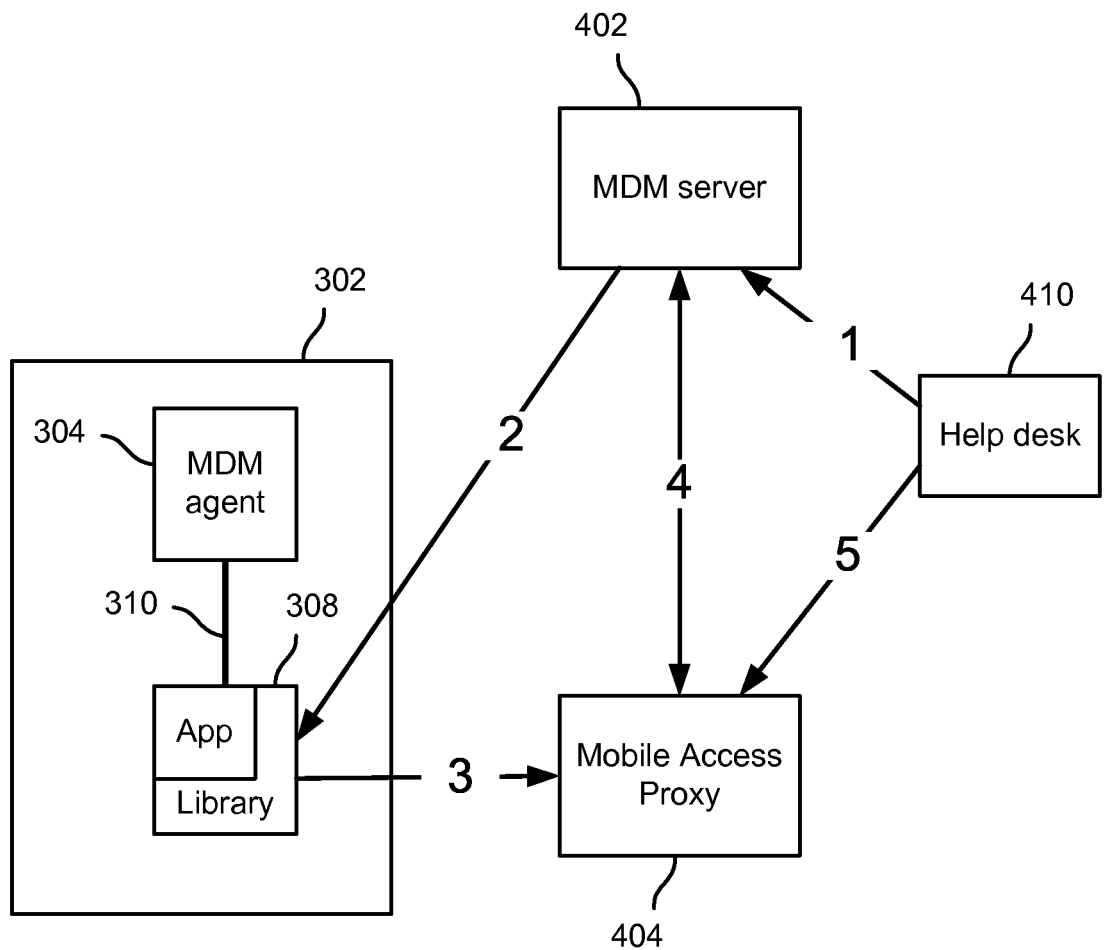
FIG. 6 is a block diagram illustrating an embodiment of a system to provide a help desk initiated help desk session.

FIG. 6 is a block diagram illustrating an embodiment of a system to provide a help desk initiated help desk session. In various embodiments, the system of FIG. 6 may implement the process of FIG. 5. In the example shown, a help desk technician using help desk console/system 410 initiates a help desk session with respect to managed app instance 308 on mobile device 302 by sending a communication to MDM server 402 (arrow "1"), which in turns sends or causes to be sent to managed app instance 308 on mobile device 302 a push notification to establish the help desk session (arrow "2"). The help desk library embedded in managed app instance 308 establishes a secure connection (e.g., per app tunnel) to mobile access proxy 404 and the embedded help desk library uses the connection to establish a help desk session (arrow "3"). MDM server 402 and mobile access proxy 404 may communicate to exchange information regarding the help desk session, mobile device 302, and/or managed app instance 308, as needed to facilitate establishment and use of the help desk session (arrow "4"). For example, once the managed app instance 308 has established a secure connection to mobile access proxy 404 and set up a help desk session, mobile access proxy 404 may communicate this information to MDM server 402, which in turn may inform the help desk 410 that the help desk session has been established and is ready to be joined. The help desk 410 may in turn communicate to and/or with the mobile app instance 308 via the mobile access proxy 404 (arrow "5") to join and provide help desk services via the mobile access proxy 404 and the help desk session. For example, and without limitation, the help desk 410 may be used to request and obtain from the help desk library embedded in managed app instance 308 app runtime information such as screen captures, activity logs, and folder/file information. In addition, app user level controls may be simulated by commands entered at help desk 410 and communicated to the help desk library embedded in managed app instance 308.

Figure 7:
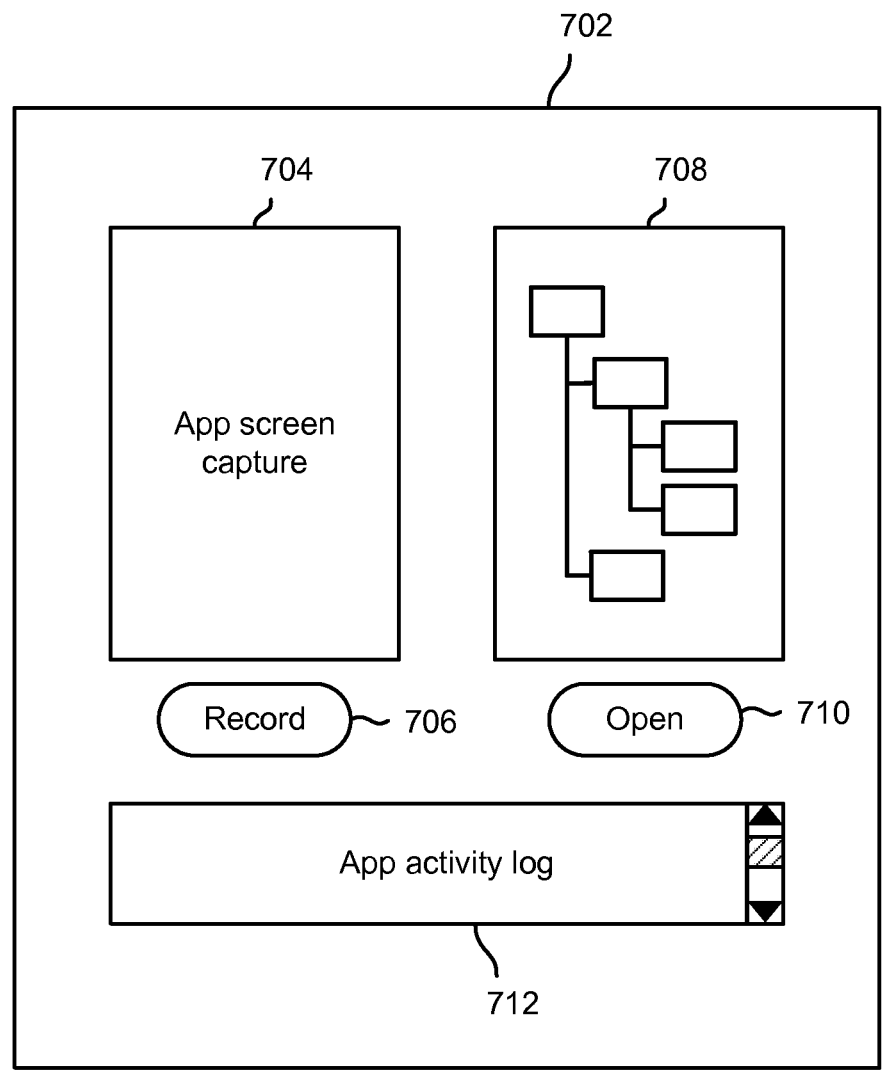
FIG. 7 is a block diagram illustrating an embodiment of a help desk system user interface.

FIG. 7 is a block diagram illustrating an embodiment of a help desk system user interface. In various embodiments, the user interface 702 of FIG. 7 may be provided by a help desk system, such as help desk system 410 of FIGS. 4 and 6. In the example shown, user interface 702 includes an app screen capture display area 704. In some embodiments, selection by a help desk technician of a "record" button 706 of user interface 702 may cause help desk application or similar code to send down to the mobile app instance on the mobile device, e.g., to the help desk library embedded therein, a command to begin to capture and send app screen shots to the help desk system for display in app screen capture display area 704. In addition, user interface 702 includes an app folder/file display area 708 in which folders and files associated with the managed mobile app instance with respect to which the help desk session is being performed may be displayed. In the example shown, activation of an "open" button 710 of user interface 702 may result in an app folder or file that is in a selected state as displayed in app folder/file display area 708 being opened. For example, in the case of a folder the contents of which are not yet displayed, selection of the "open" button 710 may result in data representative of the folder contents being obtained (e.g., via a call to the help desk library embedded in the managed mobile app) and used to display a representation of the contents in app folder/file display area 708. Similarly, in some embodiments, selection of the "open" button 710 when a displayed object/information representing an app file is in a selected state as displayed in app folder/file display area 708 may result in the file and/or a portion thereof being obtained (e.g., via a call to the help desk library embedded in the managed mobile app) and used to display the file or portion thereof in app folder/file display area 708. Finally, in the example shown in FIG. 7, the user interface 702 includes an app activity log display area 712 in which app activity log data may be displayed.

Figure 8A:
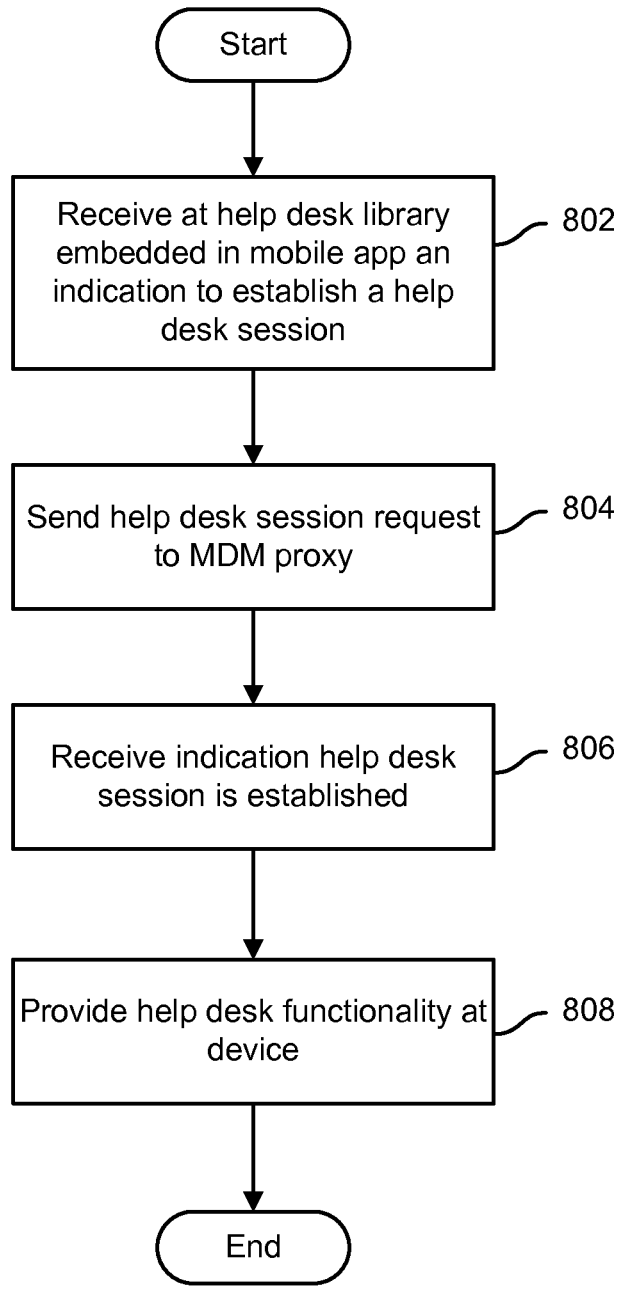
FIG. 8A is a flow chart illustrating an embodiment of a process to initiate a help desk session from a mobile device.

FIG. 8A is a flow chart illustrating an embodiment of a process to initiate a help desk session from a mobile device. In the example shown, an indication to establish a help desk session is received at a help desk library embedded in a mobile app instance, such as managed mobile app instance 308 on mobile device 302 in the examples discussed above (802). For example, a user of the mobile app may have selected a "help" or "contact help desk" control displayed in connection with use of the mobile app. The help desk library in turn sends a help desk session request to an associated MDM proxy, such as mobile access proxy 404 of FIG. 4 (804). An indication is received that a help desk session has been established (806), and the help desk session is used to obtain help with respect to the managed mobile app (808).

Figure 8B:
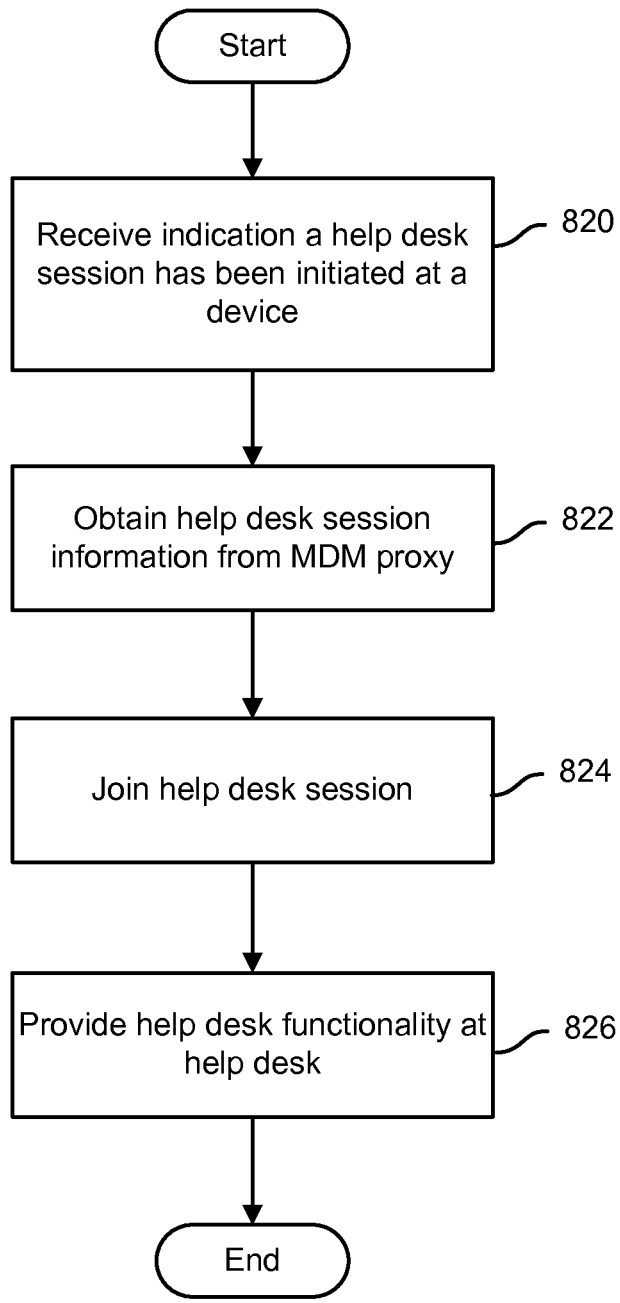
FIG. 8B is a flow chart illustrating an embodiment of a process to establish and provide a help desk session initiated by a mobile device, from the perspective of the help desk.

FIG. 8B is a flow chart illustrating an embodiment of a process to establish and provide a help desk session initiated by a mobile device, from the perspective of the help desk. In the example shown, an indication is received that a help desk session has been initiated by a mobile device, e.g., with respect to a specific managed app instance running on that mobile device (820). Help desk session information may be obtained from the MDM proxy and/or the MDM server, e.g. MDM proxy 404 and/or MDM server 402 of FIG. 4 (822). The help desk session information is used to join and/or complete the establishment of the help desk session (824). The help desk session is used to provide help desk functionality and services as described herein (826).

Figure 9:
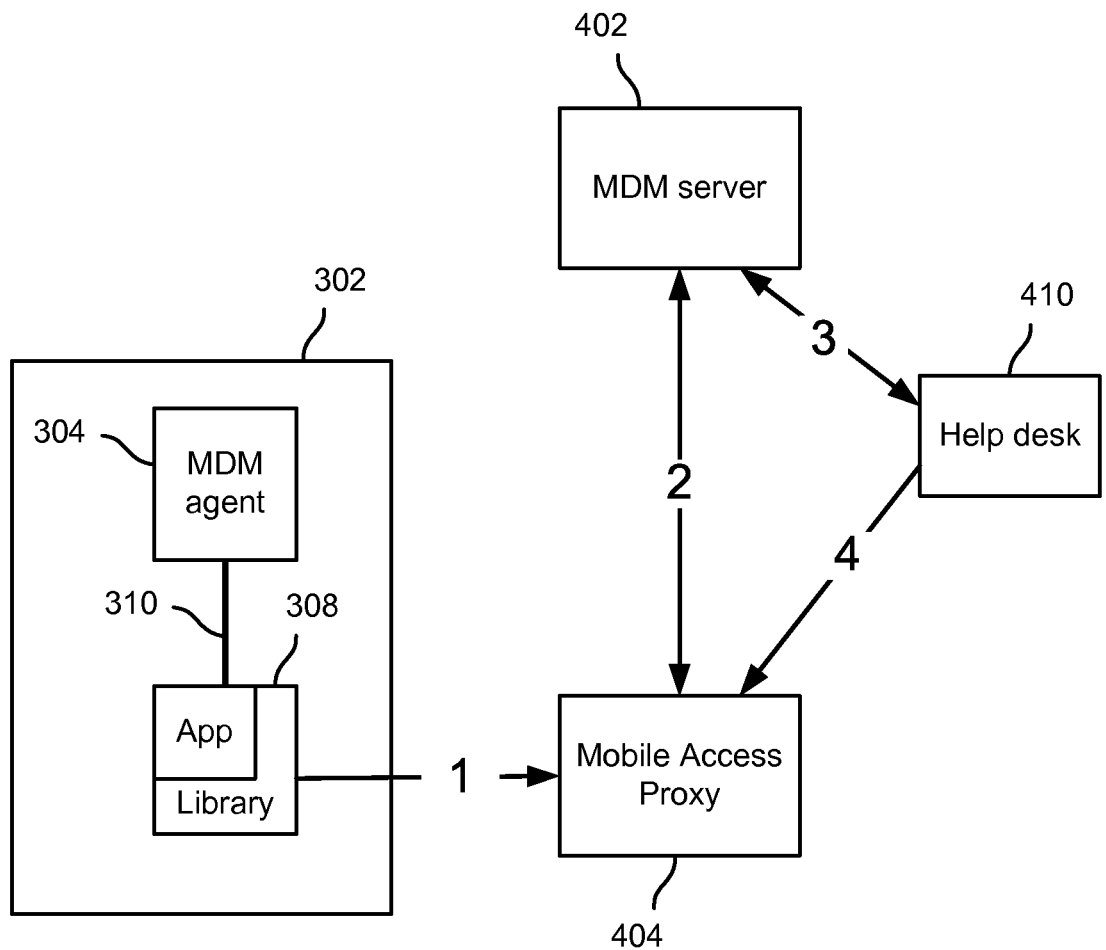
FIG. 9 is a block diagram illustrating an embodiment of a system to provide a mobile device initiated help desk session.

FIG. 9 is a block diagram illustrating an embodiment of a system to provide a mobile device initiated help desk session. In the example shown, a help desk session is initiated by a component of a help desk library embedded in managed mobile app instance 308 (arrow "1"). Mobile access proxy 404 interacts with managed mobile app instance 308 to establish a secure connection and a help desk session. Mobile access proxy 404 may interact with MDM server 402 (arrow "2") to obtain information needed to establish the secure connection and/or help desk session, to determine a security posture of the mobile device 302 and/or managed mobile app instance 308, and/or to make available to the help desk (e.g., help desk 410) and/or other systems and/or administrative users information concerning the help desk session. In the example shown, a technician uses help desk 410 to obtain information from MDM server 402 about the help desk session (arrow "3") and uses the information to join and/or facilitate the establishment of the help desk session (arrow "4"). The help desk session is used to provide help desk functionality and services.

Figure 10:
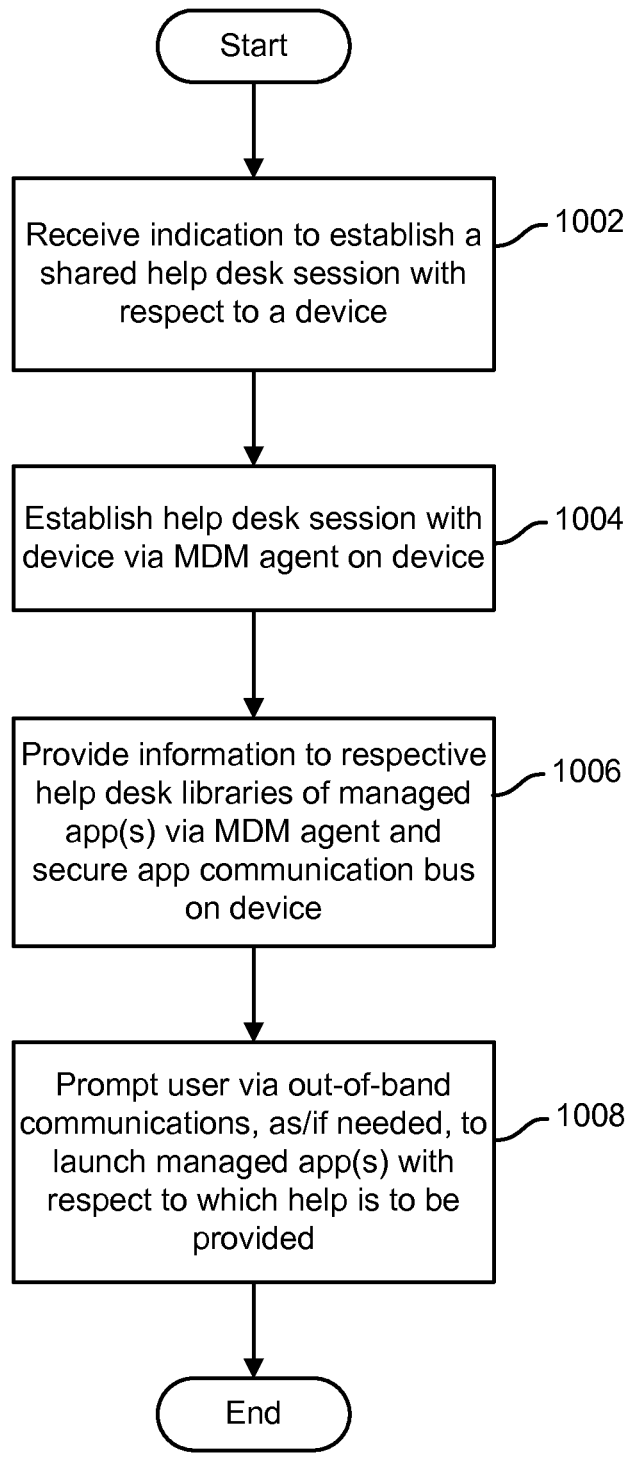
FIG. 10 is a flow chart illustrating an embodiment of a process to provide a shared help desk session.

FIG. 10 is a flow chart illustrating an embodiment of a process to provide a shared help desk session. In the example shown, an indication is received, e.g., at a help desk such as help desk 410 of FIG. 4, to establish a shared help desk session with respect to a mobile device and a set of one or more managed apps installed on the mobile device (1002). The help desk session is established via an MDM agent (e.g., MDM client and/or app) on the mobile device (1004), e.g., MDM agent 304 of FIG. 3. Commands and information are communicated to the respective help desk libraries embedded in the managed app(s), as needed, via the MDM agent (e.g., MDM agent 304) and an associated secure app communication bus (e.g., communication bus 310) (1006). To provide the shared help desk session, the mobile device user may be prompted via out-of-band communications, as/if needed, to launch a managed app with respect to which help desk actions are desired to be performed (1008). Examples of out-of-band communications that may be used in various embodiments include, without limitation, push notifications, text messages, email messages, phone calls, etc. In some embodiments, a mobile device user may be prompted to launch a managed app to cause the managed app to become active and/or move into the foreground, which for some mobile operating systems may be necessary for the help desk library embedded in that managed app to perform help desk related operations as described herein.

Figure 11:
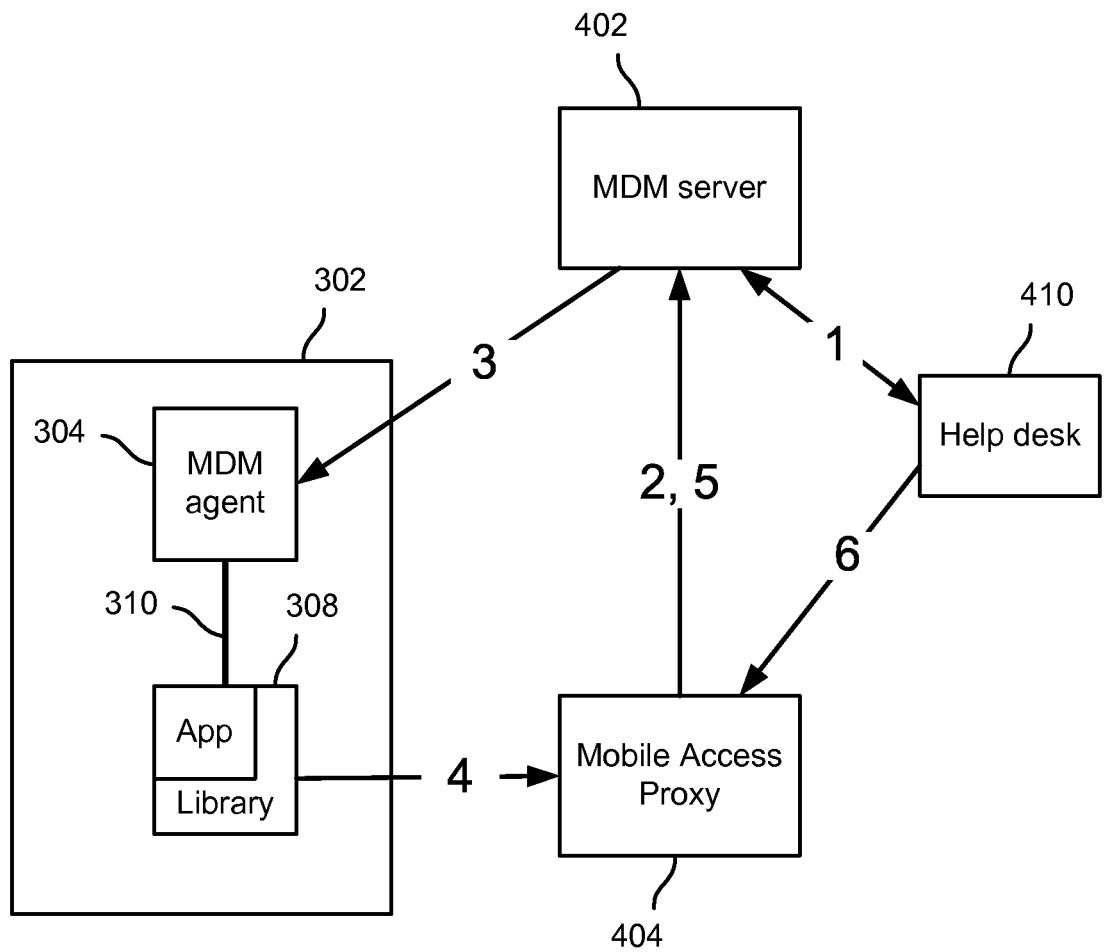
FIG. 11 is a block diagram illustrating an embodiment of a system to provide a shared help desk session.

FIG. 11 is a block diagram illustrating an embodiment of a system to provide a shared help desk session. In the example shown, a help desk technician using help desk 410 initiates a shared (e.g., multi-app) help desk session with a mobile device 302 by interacting with MDM server 402 to determine whether an existing help desk session is active with the mobile device, and if not to request establishment of a session (arrow "1"). In some embodiments, MDM server 402 may receive help desk session information regarding mobile device 302 from the mobile access proxy 404, e.g., if the mobile device has already requested establishment of a help desk session (arrow "2"). If a help desk session does not already exist, the MDM server 402 sends a command to MDM agent 304 to establish a shared help desk session (arrow "3"). In an example in which a help desk session that first involves interaction with managed mobile app 308, MDM agent 304 may communicate with managed app 308 via secure app connection bus 310 to prompt the managed app 308 to establish a help desk session via mobile access proxy 404 (arrow "4"). Mobile access proxy 404 may communicate the help desk session information to MDM server 402 (arrow "5"), which may provide the information to help desk 410. Help desk 410 in turn uses the help desk session information to join/complete establishment of the help desk session (arrow "6").

In various embodiments, a shared help desk session may be used to interact with managed mobile apps via the MDM agent, and potentially to interact with multiple managed apps in the same help desk session. For example, a mobile user may be having trouble with more than one managed app, or may be having trouble using the mobile device generally and not know which managed app(s) are involved in the problem. In another example, a mobile user may not initially be able to launch a managed app and may use the MDM agent on the mobile device to request help with respect to the managed app. In a further example, a managed app may have become misconfigured and may for that reason have become unable to connect to a corresponding resource on the enterprise network. In a shared help desk session established via the MDM agent, a remote help desk technician may be able to determine that the managed app configuration is incorrect, push the correct configuration to the mobile device via the MDM agent, and then prompt the user via an out-of-band communication to launch the reconfigured managed mobile while the help desk session is still active, enable the technician to observe whether the app as properly configured is able to be used to access the enterprise network resource.

In a further use case, a shared help desk session may be used to provision a newly-registered mobile device. An MDM agent may be downloaded and installed on the device and used to establish an active help desk session in which a help desk technician walks a mobile device user through steps required to download and configured managed apps and/or a secure communication bus between the apps.

In some embodiments, techniques disclosed herein may be used to provide training, e.g., with respect to one or more managed mobile apps and/or network-based resources accessed using such apps. A virtual classroom may be established by enabling unidirectional and/or bidirectional screen sharing among a plurality of mobile devices, enabling an instructor to demonstrate aspects of mobile app use to multiple users at the same time, each via his/her own mobile device.

In some embodiments, multiple mobile device help desk sessions may be controlled by a single helpdesk session. The single help desk session may be used to broadcast touch events and help desk keyboard input to multiple mobile devices via each device's respective help desk session.

Figure 12:
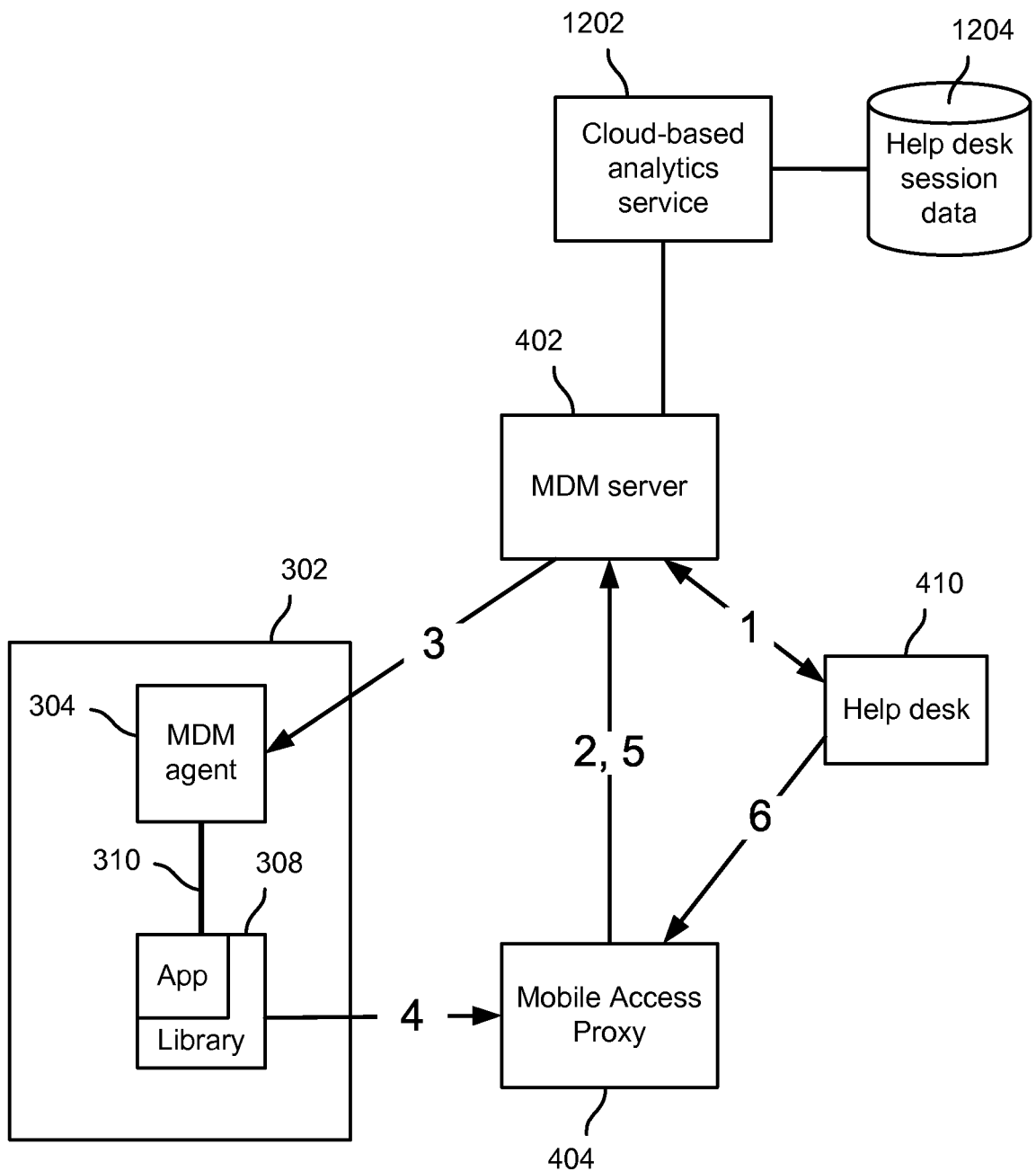
FIG. 12 is a block diagram illustrating an embodiment of a system to provide an automated help desk session.

FIG. 12 is a block diagram illustrating an embodiment of a system to provide an automated help desk session. In various embodiments, machine learning techniques may be used to build at least in part programmatically a knowledge base of mobile device and/or managed app related problems and corresponding solutions. In some embodiments, the knowledge base may be used to provide an at least partly automated help desk system and/or service. For example, a mobile device user may initiate a help desk session and report one or more symptoms of the problem with respect to which they require help. The symptoms may be sent, with or without action by a human help desk technician, to an automated help desk system configured to use the symptoms and knowledge based to attempt to classify the problem as a known problem with a known solution in the knowledge base. If a matching problem and associated solution are found in the knowledge base, the solution may in some embodiments be applied automatically, e.g., by reconfiguring one or more of the mobile device and the managed mobile app, downloading and installing an app update, etc.

In the example shown in FIG. 12, a cloud-based analytics service 1202 is provided and used to process help desk session data. A helpdesk session may be transcribed with details such as the conversation, posture, device logs, and/or other information. Corresponding structured records are stored in help desk session data store 1204. As past sessions are indexed, the current session may leverage past interactions ranked by features such as word matching, proximity, app state, and/or other parameters. In some embodiments, problem diagnosis and resolution may be automated without any manual helpdesk time.

In various embodiments, the MDM server 402 may call the cloud-based analytics service 1202. Help desk session data for the current session may be stored in help desk session data store 1204, and a knowledge base constructed as described above based on prior help desk sessions may be used to find matching problem definitions and/or associated solutions. For example, the MDM server 402 may send a request to the cloud-based analytics service 1202 to locate any similar helpdesk sessions based on prior anonymized transactions. Help desk session data for a prior transaction may in some embodiments include of a device log, screen capture, resolution, and/or other information. In various embodiments cloud-based analytics service 1202 may index the symptoms and possible resolutions, and the service 1202 may return similar helpdesk sessions with corresponding resolutions. The MDM server may display the results (e.g., similar helpdesk sessions and resolutions) to a help desk technician via help desk 410.

Using techniques disclosed herein, help desk personnel may be provided with the visibility, information, and control needed to provide effective help desk support to mobile app users.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
in response to receiving a push notification associated with an indication to establish a help desk session associated with a first managed application installed on a mobile device, causing, by a component included in a help desk library of the first managed application the first managed application to participate in establishing the help desk session, wherein the mobile device includes a plurality of managed applications and one or more non-managed applications, wherein each of the managed applications included in the plurality of managed applications includes a corresponding help desk library embedded in respective code of the respective managed applications, and wherein the one or more non-managed applications do not include the help desk library;
establishing a secure tunnel connection between the first managed application and a proxy, wherein in response to the secure tunnel connection being established, the proxy is configured to provide to a mobile device management server information that the secure tunnel connection has been established between the first managed application and the proxy wherein in response to receiving the information, the mobile device management server provides to a help desk system external to the mobile device an indication that the help desk session has been established, wherein the help desk system external to the mobile device communicates with the first managed application via the proxy and the secure tunnel connection; and
using the help desk library of the first managed application to provide the help desk session to the help desk system external to the mobile device, wherein the help desk library of the first managed application is configured to provide in real time, to the help desk system external to the mobile device, mobile app data associated with the first managed application while the first managed application is running on the mobile device, and wherein the help desk library of the first managed application is configured to allow the help desk system external to the mobile device to exercise control over the first managed application.

2. The method of claim 1, wherein the indication to establish the help desk session is received at the help desk library via a mobile device user interface associated with one or more of the first managed application and the help desk library.

3. The method of claim 1, wherein using the help desk library embedded in the code of the first managed application to provide the help desk session includes sending help desk related information to an MDM agent on the mobile device.

4. The method of claim 3, wherein the MDM agent on the mobile device is configured to provide the help desk related information to the first managed application via a secure app communication bus on the mobile device.

5. The method of claim 4, wherein the help desk session is provided with respect to the MDM agent and the first managed application.

6. The method of claim 1, wherein the mobile app data the help desk library is configured to provide in real time to the help desk system includes one or more of the following: a screen capture of an app display page associated with the first managed application; an activity log associated with the first managed application; and a file, folder, or other content-related object associated with the first managed application.

7. The method of claim 6, wherein the mobile app data further includes real time contextual information, including one or more of location, signal strength, and OS/app versions.

8. The method of claim 1, wherein the help desk library is further configured to respond to a command from the help desk system to provide to the first managed application with input data associated with an app user input.

9. The method of claim 8, wherein the help desk system is configured to:
receive via a help desk user interface an input associated with the app user input;
generate in response to the input said command to provide to the first managed application input data associated with the app user input; and
communicate the command to the help desk library via the help desk session.

10. The method of claim 1, wherein the help desk system is configured to store help desk session data associated with the help desk session in a help desk session knowledge base.

11. The method of claim 1, wherein the help desk system is configured to use a knowledge base to provide an automated response to a subsequently-received help desk data associated with a subsequent help desk session.

12. The method of claim 1, wherein multiple mobile device help desk sessions are controlled by a single helpdesk session that includes broadcast of touch events and help desk keyboard input.

13. The method of claim 1, wherein the push notification is provided from the help desk system to the mobile device.

14. The method of claim 1, wherein the push notification is provided from the help desk system to the mobile device management server and from the mobile device management server to the mobile device.

15. A system, comprising:
a communication interface; and
a processor coupled to the communication interface and configured to:
in response to receiving a push notification associated with an indication to establish a help desk session associated with a first managed application installed on a mobile device, cause, by a component included in a help desk library of the first managed application the first managed application to participate in establishing the help desk session, wherein the mobile device includes a plurality of managed applications and one or more non-managed applications, wherein each of the managed applications included in the plurality of managed applications includes a corresponding help desk library embedded in respective code of the respective managed applications, and wherein the one or more non-managed applications do not include the help desk library;

establish a secure tunnel connection between the first managed application and a proxy, wherein in response to the secure tunnel connection being established, the proxy is configured to provide to a mobile device management server information that the secure tunnel connection has been established between the first managed application and the proxy wherein in response to receiving the information, the mobile device management server is configured to provide to a help desk system external to the mobile device an indication that the help desk session has been established, wherein the help desk system external to the mobile device communicates with the first managed application via the proxy and the secure tunnel connection; and use the help desk library of the first managed application to provide the help desk session to the help desk system external to the mobile device, wherein the help desk library of the first managed application is configured to provide in real time, to the help desk external to the mobile device, mobile app data associated with the first managed application while the first managed application is running on the mobile device, and wherein the help desk library of the first managed application is configured to allow the help desk system external to the mobile device to exercise control over the first managed application.

16. The system of claim 15, wherein the processor is further configured to receive an indication to provide to the first managed application input data associated with an app user input, and send via the communication interface a command to the help desk library embedded in the mobile app code of the first managed application to provide the input data to the first managed application.

17. A computer program product embodied in a non-transitory computer readable storage medium and comprising computer instructions for:

in response to receiving a push notification associated with an indication to establish a help desk session associated with a first managed application installed on a mobile device, causing, by a component included in a help desk library of the first managed application the first managed application to participate in establishing the help desk session, wherein the mobile device includes a plurality of managed applications and one or more non-managed applications, wherein each of the managed applications included in the plurality of managed applications includes a corresponding help desk library embedded in respective code of the respective managed applications, and wherein the one or more non-managed applications do not include the help desk library;

establishing a secure tunnel connection between the first managed application and a proxy, wherein in response to the secure tunnel connection being established, the proxy is configured to provide to a mobile device management server information that the secure tunnel connection has been established between the first managed application and the proxy, wherein in response to receiving the information, the mobile device management server provides to a help desk system external to the mobile device an indication that the help desk session has been established, wherein the help desk system external to the mobile device communicates with the first managed application via the proxy and the secure tunnel connection; and using the help desk library of the first managed application to provide the help desk session to the help desk system external to the mobile device, wherein the help desk library of the first managed application is configured to provide in real time, to the help desk system external to the mobile device, mobile app data associated with the first managed application while the first managed application is running on the mobile device, and wherein the help desk library of the first managed application is configured to allow the help desk system external to the mobile device to exercise control over the first managed application.

* * * * *

UNITED STATES PATENT AND TRADEMARK OFFICE
CERTIFICATE OF CORRECTION

PATENT NO. : 10,680,905 B1  
APPLICATION NO. : 14/563483  
DATED : June 9, 2020  
INVENTOR(S) : Mansu Kim, Benjamin Chokchai Markines and Suresh Kumar Batchu Page 1 of 1

It is certified that error appears in the above-identified patent and that said Letters Patent is hereby corrected as shown below:

In the Claims  
In Column 9, Line(s) 31, Claim 1, after "application", insert --,--.  
In Column 9, Line(s) 48, Claim 1, after "proxy", insert --,--.  
In Column 10, Line(s) 67, Claim 15, after "application", insert --,--.  
In Column 11, Line(s) 17, Claim 15, after "proxy", insert --,--.  
In Column 12, Line(s) 8, Claim 17, after "application", insert --,--.

Signed and Sealed this  
Eighth Day of December, 2020

Andrei Iancu  
*Director of the United States Patent and Trademark Office*